(12) United States Patent
Henke et al.

(10) Patent No.: US 8,960,786 B2
(45) Date of Patent: Feb. 24, 2015

(54) SUPPORTING STRUCTURE FOR A SWIVELABLE CENTER ARMREST

(75) Inventors: Hans Henke, Grosslangheim (DE); Andreas Sulzbacher, Volkach (DE); Kerstin Weckert, Schwarzach (DE)

(73) Assignee: F.S. Fehrer Automotive GmbH, Kitzingen (DE)

( * ) Notice: Subject to any disclaimer, the term of this patent is extended or adjusted under 35 U.S.C. 154(b) by 594 days.

(21) Appl. No.: 13/272,805

(22) Filed: Oct. 13, 2011

(65) Prior Publication Data

US 2012/0104822 A1 May 3, 2012

(30) Foreign Application Priority Data

Oct. 27, 2010 (DE) .......................... 10 2010 049 497

(51) Int. Cl.
*A47C 13/00* (2006.01)
*B60N 2/46* (2006.01)

(52) U.S. Cl.
CPC .................................. *B60N 2/4613* (2013.01)
USPC ...... 297/113; 297/14; 297/411.3; 297/411.32

(58) Field of Classification Search
USPC ............................ 297/14, 113, 411.3, 411.32
See application file for complete search history.

(56) References Cited

U.S. PATENT DOCUMENTS

| | | | | |
|---|---|---|---|---|
| 3,909,063 A | * | 9/1975 | Bonisch et al. | 297/113 |
| 4,435,011 A | * | 3/1984 | Hakamata | 297/113 |
| 4,759,583 A | * | 7/1988 | Schrom et al. | 297/113 |
| 5,292,171 A | * | 3/1994 | Harrell | 297/113 |
| 5,352,012 A | * | 10/1994 | Chowdhury et al. | 297/113 |
| 5,752,739 A | * | 5/1998 | Saeki | 297/113 |

FOREIGN PATENT DOCUMENTS

| | | | | |
|---|---|---|---|---|
| DE | 102008051619 A1 | | 5/2010 | |
| EP | 518358 A1 | * | 12/1992 | ............... B60N 2/46 |
| EP | 604375 A1 | * | 6/1994 | ............... B60N 2/46 |
| FR | 2902717 A1 | | 12/2007 | |

* cited by examiner

*Primary Examiner* — Laurie Cranmer
(74) *Attorney, Agent, or Firm* — Quarles & Brady LLP (57) ABSTRACT

A center armrest supporting structure for mounting an arm support can be swiveled between a lower use position and an upper rest position for use in a vehicle. Here, the carrying structure as an element of the vehicle features a left and a right console part made of a metal sheet, which have the arm support mounted thereon via bolt sections. Here, each console part on the side facing toward the arm support features a bearing shell made of plastics, wherein the bearing shell can be mounted on the console part by an assembly movement which is directed at least partially in parallel to the swivel axis.

11 Claims, 6 Drawing Sheets

SUPPORTING STRUCTURE FOR A SWIVELABLE CENTER ARMREST

CROSS REFERENCE TO RELATED APPLICATION

The present application claims the benefit of German Patent Application No. 10 2010 049 497.6 filed Oct. 27, 2010, which is fully incorporated herein by reference.

STATEMENT REGARDING FEDERALLY SPONSORED RESEARCH OR DEVELOPMENT

Not applicable.

FIELD OF THE INVENTION

The present invention relates to a center armrest supporting structure for mounting a swivelable center armrest for use in a vehicle.

BACKGROUND OF THE INVENTION

In the state of the art center armrests are frequently used in vehicles in a swivelable configuration. Here, the arm support requires bearing at the mounting location. In this context it is irrelevant whether the attachment is performed with the aid of a console being rigidly connected to the vehicle or whether the console as such is equally movable relative to the vehicle. This can be the case for instance in overall foldable backrests.

To achieve the necessary stiffness for ensuring the required supporting force of the arm support, the console parts in general are made of metal. Moreover, it is common practice in the state of the art to produce the console parts from a metal sheet. In this regard, it is a disadvantage that a metal sheet provides only a small bearing surface for providing the supporting effect. Moreover, it is a drawback when using a metal sheet that it is not possible to realize specific sliding properties.

Hence, it is known in the state of the art to furnish the metallic console parts with a plastic component for ensuring the desired sliding properties. The plastic components known to be used in this context, as a rule, are formed with a highly complex design and thus require the use of a complicated production tool.

SUMMARY OF THE INVENTION

It is an object of the present invention to suggest a center armrest supporting structure by means of which the desired bearing properties can be realized in the presence of a metallic console component and at the same time the costs can be minimized.

This object is attained by an inventive center armrest supporting structure having an arm support which can be swiveled about a swivel axis into a lower use position and into an upper rest position, wherein a left and a right console part made of a metal sheet are mounted at carrying structure of a vehicle. Each console part has a bearing bore in conformity with the swivel axis, wherein a left and a right bolt section are provided at the arm support. Each bolt section is respectively mounted in the bearing bore, wherein each console part on the side facing toward the arm support features a bearing shell made of plastics. The bearing shell can be mounted on the console part by an assembly movement which is directed at least partially in parallel to the swivel axis.

A center armrest supporting structure for mounting a swivelable center armrest is used in vehicles having an arm support. Here, the arm support can be swiveled about a swivel axis between a lower use position and an upper rest position. Moreover, the center armrest supporting structure requires a carrying structure as an element of the vehicle, wherein a left and a right console part made of a metal sheet are mounted at said carrying structure. Here, the type of the carrying structure is inessential. What is essential is that two metallic console parts formed of a metal sheet serve as the supporting elements for the center armrest supporting structure. Here, each console part has a bearing bore in conformity with a swivel axis. Hence, the swiveling of the arm support about the swivel axis is performed in the bearing bore. For this purpose, a left and a right bolt section are provided at the arm support, wherein each bolt section is mounted in the bearing bore. Thus, the arm support is supported via the bolt section in the bearing bore of the console.

According to the invention, each console part on the side facing toward the arm support is furnished with a bearing shell made of plastics, wherein the bearing shell can be mounted on the console part by executing an assembly movement. Here, it is relevant that the assembly movement is at least partially performed in the direction of the swivel axis, in particular for termination of the movement.

Thanks to the newly created solution of providing the bearing shell on the console part with simple assembly in the axial direction, it is possible to create a particularly cost-efficient component for a bearing shell, which at the same time advantageously provides the required sliding properties for the center armrest supporting structure. Mountability in the direction of the swivel axis at the same time obviously leads to a relatively simple tool shape for the bearing shell. Moreover, it suffices to form the bearing shell on the side facing toward the arm support, while a bearing shell is not required on the opposite side of the respective console part.

It is particularly advantageous if at least one bearing shell features at least one elastically deformable latching projection. To implement the latching function a latching bolt is here disposed at the arm support in parallel to the swivel axis. In this way, it is possible to arrest the latching bolt by means of the latching projection, in particular in the use position. Hence, it is ensured that the arm support remains in the desired position and is not caused to vibrate or to swivel back and forth.

It is particularly advantageous if the bearing shell is produced without the use of sliders in the injection molding process involving a deformation essentially in the direction of the swivel axis. By means of this production process using a minimalistic injection molding tool a particularly cost-efficient production can be enabled. Due to the newly created embodiment it is also possible for the first time to produce the bearing shell without the use of sliders. Here, the ejectors, which are generally necessary for the injection molding process, can be omitted.

The bearing shell advantageously features at least one centering pin which defines the position in the bearing shell at the console component. In this regard, various centering options are available, wherein in a first alternative a sleeve section forming the bearing bore may form a centering means at the bearing shell. Thus, the additional centering pin defines the rotational position of the bearing shell at the console component with respect to the swivel axis. By the same token, in a further alternative it is possible to make provision for several centering pins which in their entirety define the position of the bearing shell at the console.

It is particularly advantageous for mounting the center armrest supporting structure if at least one bearing shell on the side facing toward the arm support is furnished with a U-shaped indention surrounding the bearing bore. Here, the U-shaped indentation serves as an insertion aid during assembly of the arm support. In this regard, a projection being complementary to the width of the indentation is necessary at the arm support. Hence, the arm support can be inserted at least on this side into the U-shaped indentation in the form of a guide in a direction radial to the swivel axis. By the same token, due to the U-shaped indentation, centering of the arm support with respect to the swivel axis is automatically carried out. This is particularly advantageous since during assembly of the arm support, as a rule, only a very limited possibility of insight into the mounting location is available.

Moreover, it is particularly advantageous if at least one bearing shell on the side facing toward the arm support features at least one deformable projection surrounding the bearing bore and being in abutment against a sliding surface at the arm support. When the deformable projection is correspondingly configured, it is hence possible to ensure that tolerance-related play in the direction of the swivel axis between the bearing shells relative to the dimensions of the arm support is essentially eliminated. Hence, the deformable projections can exert pressure on the arm support and can at the same time press the same on the other side against the other bearing shell.

Thus, it is particularly advantageous to provide on one side the projection and in the other bearing shell the U-shaped indentation. Thus, it is possible to insert the bearing means firstly on the side of the deformable projection together with the bolt section at the arm support into the corresponding bearing bore, and then on the second side to insert the arm support in conformity with the swivel axis into the U-shaped indentation.

Here, it is advantageous if a bolt section is formed by a fixed bearing bolt being connected to the arm support and if the other bolt section is formed by a screw shaft of a bearing screw being screwed into the arm support. Thus, the fixed bearing bolt can be correspondingly inserted into the bearing bore, while subsequent to the correct positioning of the arm support with respect to the swivel axis the bearing screw is then screwed in.

It is advantageous if the center armrest supporting structure is used in a center armrest which is integrated in a backseat bench. Here, the arm support in the rest position at the same time forms a part of a backrest.

The bearing shell constitutes the essential component of the present invention and is used in a center armrest supporting structure according to one of the preceding embodiments.

BRIEF DESCRIPTION OF THE DRAWINGS

In the following figures an optional exemplary embodiment of an inventive center armrest supporting structure is schematically illustrated.

In the drawings.

DETAILED DESCRIPTION OF THE EXAMPLE EMBODIMENTS

Figure 1:
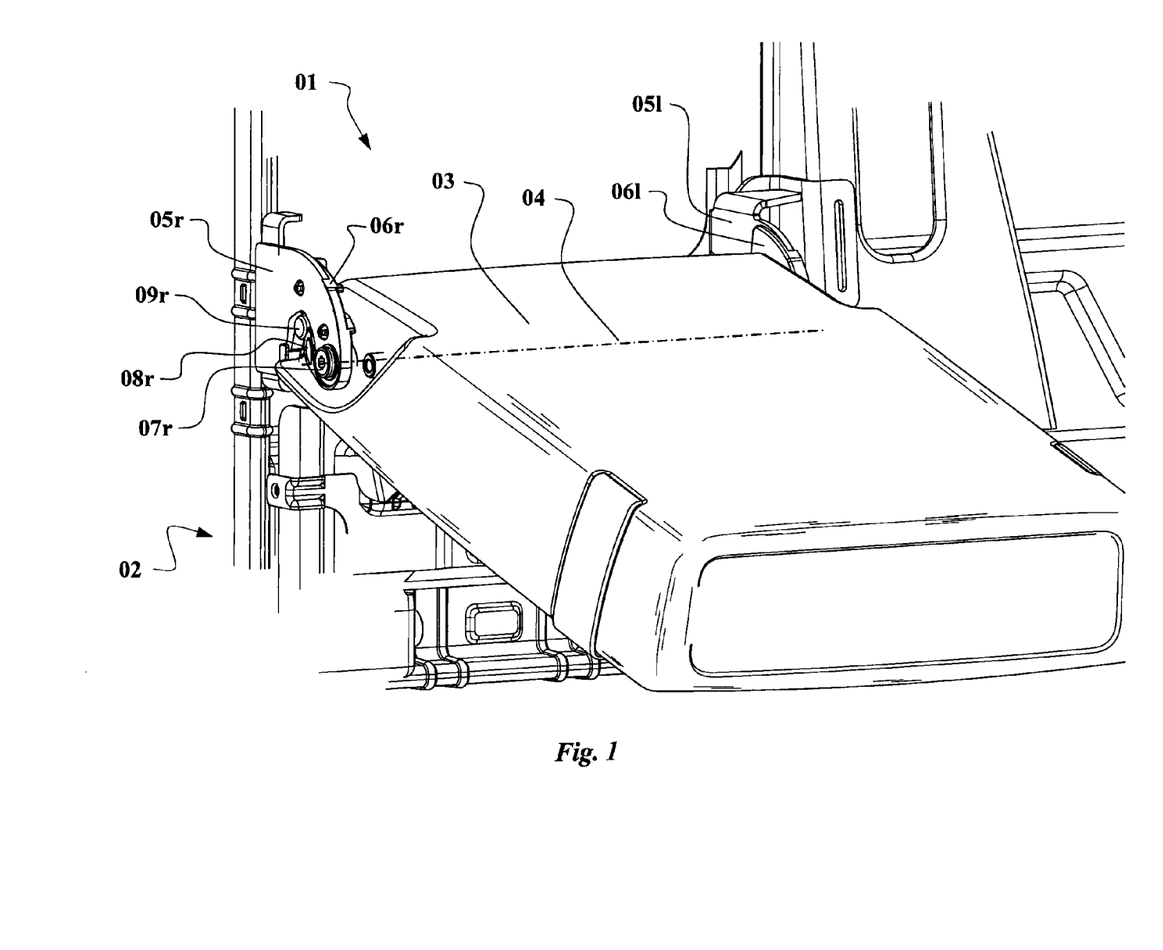
FIG. 1 shows an arm support 03 in the use position with a swivelable center armrest supporting structure in a perspective view.

FIG. 1 shows a perspective view of a swivelable center armrest 01 which forms a part of a backseat bench. The center armrest 01 is shown, which is essentially composed of the arm support 03 which is swivelably connected via the swivel axis 04 to the carrying structure 02 and the console parts 05r and 05l being firmly connected thereto. Here, the carrying structure 02 constitutes a part of the backseat bench. The two-sided bearing structure is shown, wherein the center armrest supporting structure is essentially formed by the left console part 05l and the right console part 05r having the left bearing shell 06l and the right bearing shell 06r mounted thereon in interaction with the arm support 03. The mounting location at the arm support 03 is formed on the right-hand side by the bearing screw 07r. Moreover, the latching bolt 09r is shown, which engages behind the latching projection 08r and thus prevents unintentional upward swiveling of the arm support 03.

Figure 2A:
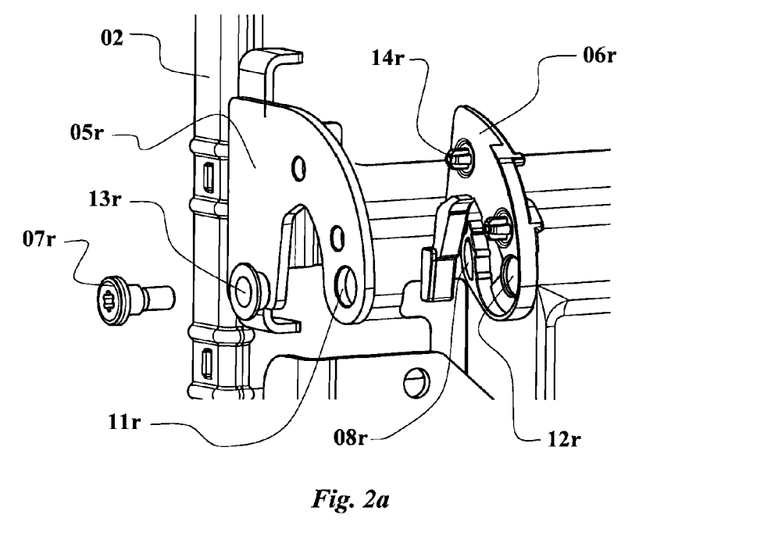
FIGS. 2a and 2b show exploded views of the connection of the bearing shell 06r with the console part 05r on the right-hand side according to FIG. 1.

FIG. 2a schematically shows a first exploded view of the mounting location on the right-hand side. Again, the carrying structure 02 is shown, which has the right console part 05r mounted thereon in a firmly connected manner. According to the invention, the console part 05r is made of a metal sheet, which here at the mounting location features the corresponding bearing bore 11r. According to the invention, the bearing shell 06r is fitted onto the console part 05r. The flat construction with a partially surrounding edge is shown. Just like the console part 05r the bearing shell 06r is furnished with a corresponding bearing bore 12r. The advantageous embodiment having the latching projection 08r is also shown. It is obvious that the bearing shell 06r can be mounted on the console part 05r essentially in the direction of the swivel axis. Moreover, a sliding sleeve 13r is shown, which is inserted into the bearing bore of the console part and the bearing shell from the outside. By means of this design advantageous sliding properties and at the same time the necessary stability are provided. The counterpart at the arm support in the case of the bearing structure on the right-hand side is constituted by the bearing screw 07r which has the corresponding bolt section, which in the mounted state is disposed within the bearing sleeve 13r. Here, the bearing screw 07r is rotationally fixedly connected to the armrest 03.

Figure 2B:
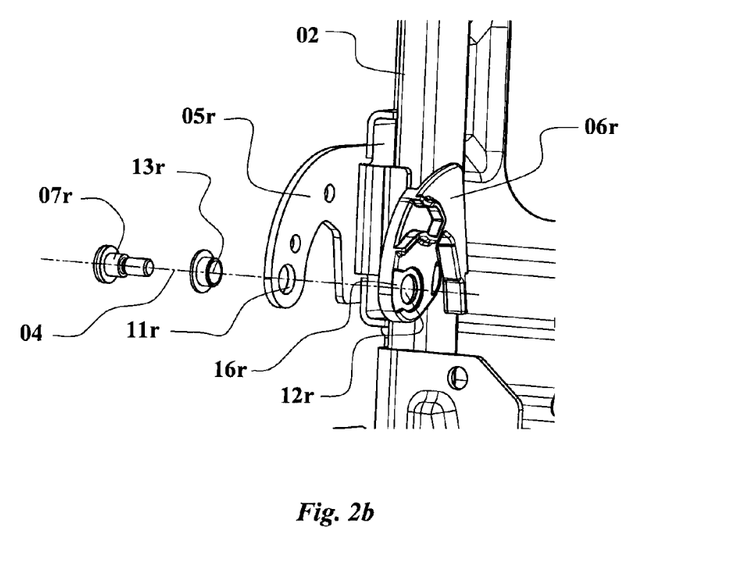

FIG. 2b shows the same embodiment as that shown in FIG. 2a in another perspective view. This figure also shows the swivel axis 04. In the bearing shell 06r in the region surrounding the bearing bore 12r on the side of the arm support the advantageous U-shaped indentation 16r is shown. This enables an improved assembly of the arm support 03 and easy detection of the position of the arm support 03 and the console part 05 being in conformity with the swivel axis 04.

Figure 3A:
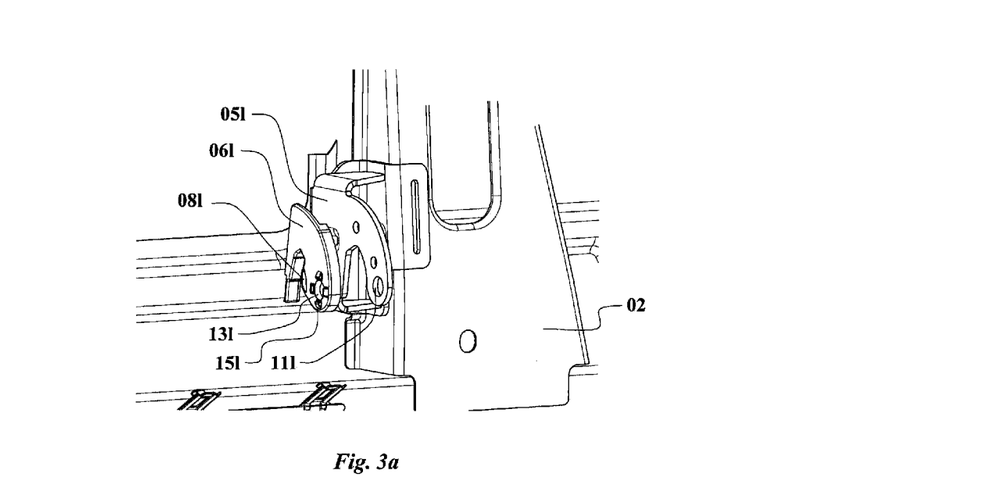
FIGS. 3a and 3b show exploded views of the connection of the bearing shell 06l with the console part 05l on the left-hand side according to FIG. 1.

FIG. 3a schematically illustrates the mounting location on the left-hand side in an exploded perspective view. Again, the carrying structure 02 is shown, which has the left console part 05l firmly connected thereto. Just like on the right-hand side, the console part 05l is made of a metal sheet and has the necessary bearing bore 11l. According to the invention, the bearing shell 06l is equally mounted on the left-hand side on the console part 05l and also exhibits the advantageous latching projection 08l which is disposed on the right-hand side as well. In contrast to the right-hand side, the sliding sleeve 13*l* is a part of the bearing shell 06*l*. To prevent disadvantageous play between the bearing shells 06*r* and 06*l*, the advantageously deformable projections 15*l* are provided in the bearing shell 06*l* on the left-hand side.

Figure 3B:
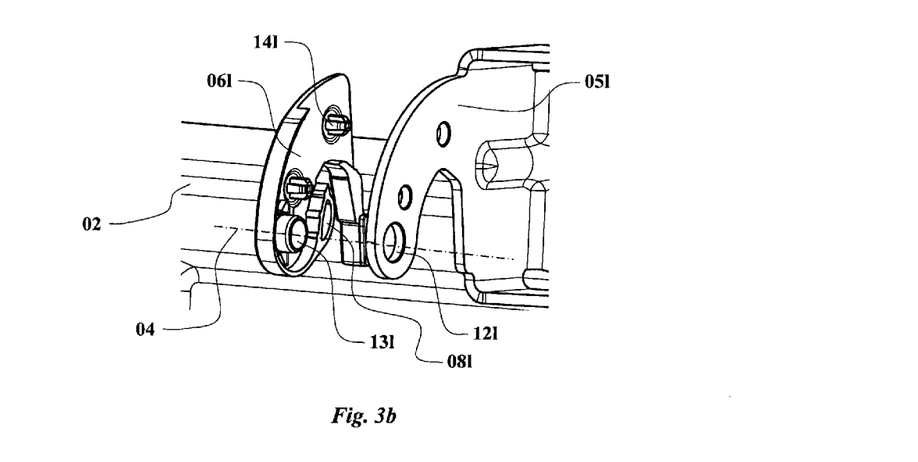

FIG. 3*b* again shows a perspective view in addition to FIG. 3*a*. Here, the console part 05*l* and the corresponding bearing shell 06*l* are shown again. Moreover, the two centering pins 14*l* are clearly discernible, which advantageously ensure the positioning of the bearing shell 06*l* at the console part 05*l*.

Figure 4A:
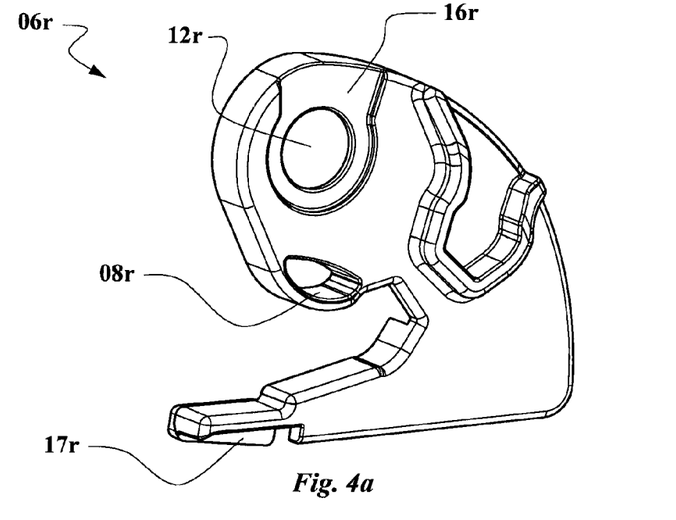
FIGS. 4a and 4b show views of the bearing shell 06r on the right-hand side according to FIG. 1.
Figure 4B:
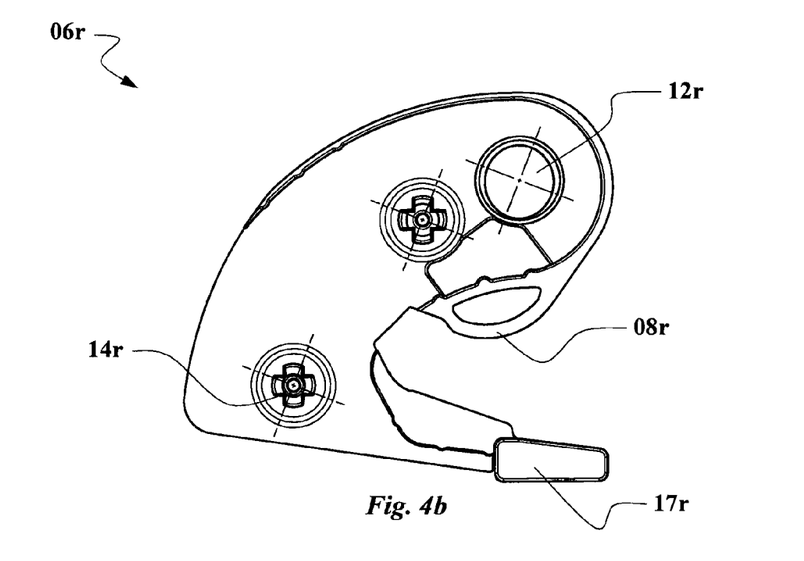

FIGS. 4*a* and 4*b* illustrate the right bearing shell 06*r*. Here, on the one hand the advantageous embodiment is shown which enables deformation in the injection molding process without the use of sliders. Hence, the bearing shell 06*r* is merely formed of an even plane having a partially surrounding edge. Here, the required bearing bore 12*r* is supplemented by the advantageous U-shaped indentation 16*r*. At the same time the latching projection 08*r* is shown again. The hold of the bearing shell 06*r* on the console part is supported by a flap 17*r*. Assembly of the bearing shell 06*r* on the console part 05*r* is performed with the aid of a swivel-insertion movement, wherein firstly the flap 17*r* is inserted behind the respective section at the console part 05*r* and the bearing shell 06*r* is then folded into a parallel position so as to abut against the console part 05*r*, wherein the assembly movement is finally executed in the direction of the swivel axis 04.

Figure 5A:
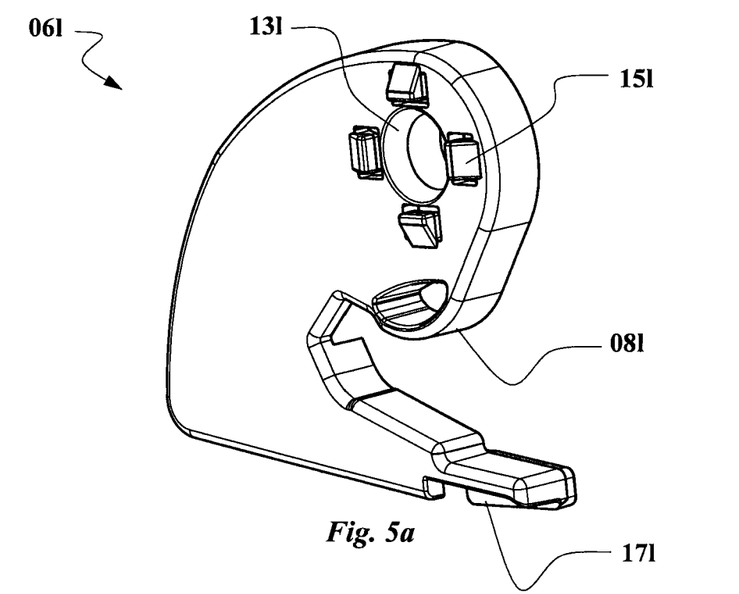
FIGS. 5a and 5b show views of the bearing shell 06l on the left-hand side according to FIG. 1.
Figure 5B:
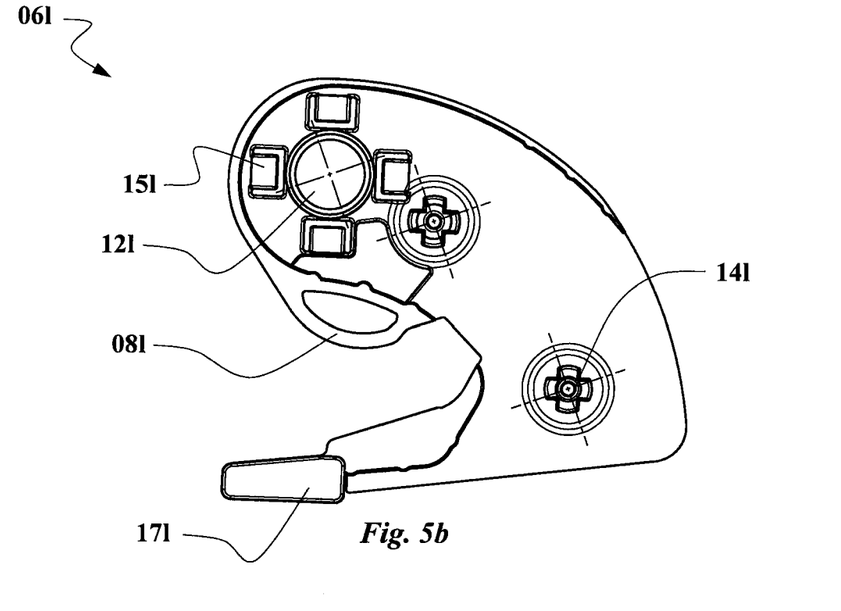

FIGS. 5*a* and 5*b* show the bearing shell 06*l* on the left-hand side, which is designed so as to be essentially identical to the design of the right-hand side. However, contrary to the design with the indentation on the right-hand side, advantageously deformable projections 15*l* are provided on the left-hand side of the bearing shell 06*l*. Said projections can act as elastic spring members and thus may compensate production-related and process-related play between the bearing shells 06*r* and 06*l* relative to the arm support 03.

Figure 6:
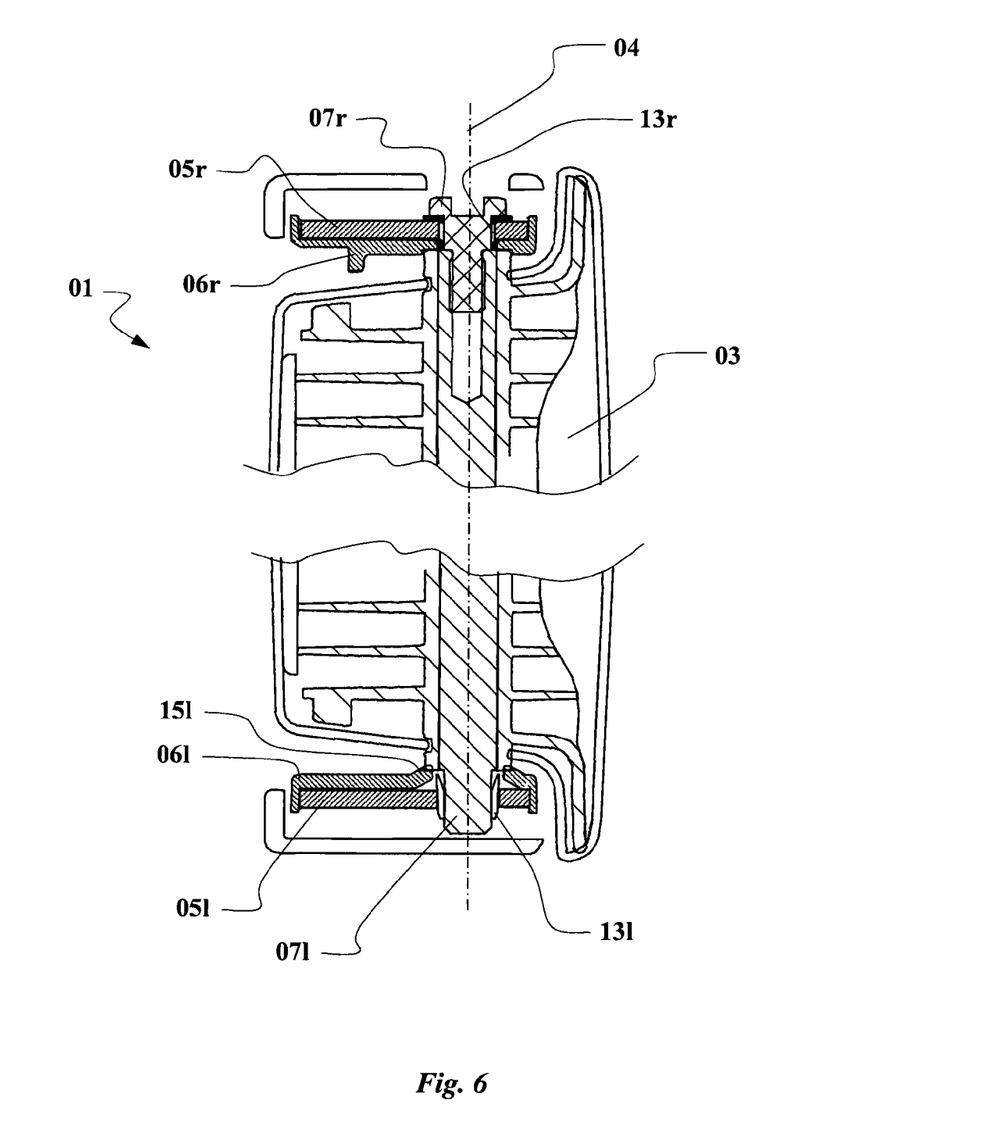
FIG. 6 shows a cross-section of the center armrest supporting structure according to FIG. 1.

The exemplary structure of the center armrest supporting structure is equally shown in the cross-sectional view of FIG. 06. Here, the arm support of the center armrest 01 is disposed in the center. In this case, a largely continuous bolt is disposed on the swivel axis 04, which on the right-hand side forms the corresponding bearing bolt 07*l*. The sliding sleeve 13*l* serving as a sliding counterpart is disposed so as to surround the bearing bolt. Here, the sliding sleeve 13*l* is a component of the bearing shell 06*l*. On the opposite side the bearing screw 07*r* is disposed on the right-hand side. The sliding friction at the right mounting location thus takes place between the bearing screw 07*r* and the additionally mounted sliding sleeve 13*r*. Moreover, the illustrated console parts 05*l* and 05*r* disposed on the left-hand side and on the right-hand side are shown. The bearing shells 06*r* and 06*l* are disposed above said console parts.

The advantageous exemplary alternative embodiment of the center armrest supporting structure is shown, wherein for assembly purposes, the left bearing bolt 07*l* can be inserted into the corresponding bearing bore or the sliding bearing sleeve 13*l*, and swiveling in can then be performed on the right-hand side. The U-shaped indentation 16*r* shown in FIG. 4*a* here enhances the detection of the proper positioning with respect to the swivel axis 04. Subsequently, the arrangement is simultaneously supplemented by the bearing screw 07*r*, and the second mounting location is created.

The invention claimed is:

1. A center armrest supporting structure for mounting a swivelable center armrest on carrying structure of a vehicle, said supporting structure comprising:
an arm support which can be swiveled about a swivel axis into a lower use position and into an upper rest position, wherein a left and a right console part forming part of the arm support and made of a metal sheet are mountable at the carrying structure, wherein each console part has a bearing bore defining the swivel axis; and
a left and a right bolt section provided at the arm support, wherein each bolt section is respectively mounted in the bearing bore, and each console part on a side facing toward the arm support features a bearing shell made of plastics mounted on a respective console part, said bearing shell including an extension extending parallel to the swivel axis and received in an opening formed in the respective console part requiring the bearing shell be mounted on the console part by an assembly movement which is directed at least partially in parallel to the swivel axis.

2. The center armrest supporting structure according to claim 1, in which at least one bearing shell features at least one elastically deformable latching projection, wherein a latching bolt of the arm support can be arrested in a position being parallel to the swivel axis, in particular in the use position, by means of the latching projection.

3. The center armrest supporting structure according to claim 1, in which the bearing shell is produced without the use of sliders in an injection molding process involving a deformation essentially in the direction of the swivel axis.

4. The center armrest supporting structure according to claim 1, in which the bearing shell features at least one centering pin which defines the position of the bearing shell at the console part.

5. The center armrest supporting structure according to claim 1, in which at least one bearing shell on the side facing toward the arm support is furnished with a U-shaped indentation surrounding the bearing bore and serving as an insertion aid for mounting the arm support, wherein a projection being complementary to the width of the indentation is provided at the arm support.

6. The center armrest supporting structure according to claim 1, in which at least one bearing shell on the side facing toward the arm support is furnished with at least one deformable projection surrounding the bearing bore and being in abutment against a sliding surface at the arm support, whereby tolerance-related play into the direction of the swivel axis is essentially eliminated between the bearing shells and the arm support.

7. The center armrest supporting structure according to claim 1, in which the center armrest is integrated in a backseat bench, wherein the arm support in the rest position forms a part of a backrest.

8. A bearing shell for use in a center armrest supporting structure according to claim 1, said bearing shell comprising:
at least one elastically deformable latching projection, wherein a latching bolt of the arm support can be arrested in a position being parallel to the swivel axis, in particular in the use position, by means of the latching projection.

9. The center armrest supporting structure according to claim 1, in which said extension is a centering pin received in said opening of the respective console part.

10. The center armrest supporting structure according to claim 1, in which said extension is a bearing sleeve received in said bearing bore of the respective console part.

11. A center armrest supporting structure for mounting a swivelable center armrest on carrying structure of a vehicle, said supporting structure comprising:
an arm support which can be swiveled about a swivel axis into a lower use position and into an upper rest position, wherein a left and a right console part forming part of the arm support and made of a metal sheet are mountable at the carrying structure, wherein each console part has a bearing bore defining the swivel axis; and a left and a right bolt section provided at the arm support, wherein each bolt section is respectively mounted in the bearing bore, and each console part on a side facing toward the arm support features a bearing shell made of plastics, the bearing shell being mounted on the console part by an assembly movement which is directed at least partially in parallel to the swivel axis, wherein one of the left bolt section and the right bolt section is formed by a bearing bolt being fixedly connected to the arm support, and the other of the left bolt section and the right bolt section is formed by a screw shaft of a bearing screw which is screwed into the arm support.

* * * * *